May 6, 1924.
A. V. TERRY
1,493,134
SADDLE OR SEAT FOR CYCLES, MOTOR CYCLES, AND THE LIKE
Filed Sept. 3. 1921
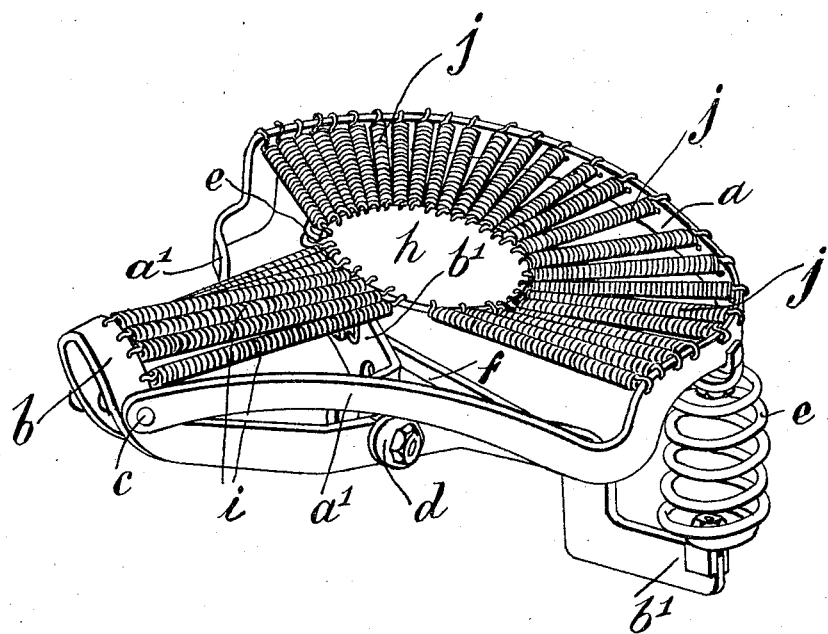

Patented May 6, 1924.

1,493,134

UNITED STATES PATENT OFFICE.

ALBERT VICTOR TERRY, OF REDDITCH, ENGLAND.

SADDLE OR SEAT FOR CYCLES, MOTOR CYCLES, AND THE LIKE.

Application filed September 3, 1921. Serial No. 498,379.

*To all whom it may concern:*

Be it known that I, ALBERT VICTOR TERRY, a subject of the Kingdom of Great Britain, residing at "Oakenshaw," Headless Cross, Redditch, in the county of Worcester, England, have invented certain new and useful Improvements in or Relating to Saddles or Seats for Cycles, Motor Cycles, and the like, of which the following is a specification.

This invention comprises certain improvements in or relating to saddles or seats for cycles, motor cycles, and the like, and comprehends a seat or saddle, the seat proper of which is composed essentially or substantially of springs. Advantageously the seat proper comprises an aggregation of springs extending rearwardly from the peak to a plate or central member, from which latter another aggregation of springs diverge rearwardly to an arch constituting the rear boundary of the seat proper.

In order that this invention may be clearly understood and readily carried into practice, reference may be had to the appended drawing, which illustrates in perspective an embodiment of the present invention.

In a convenient embodiment of the present invention, the frame of the saddle is composed of a substantially semi-circular arch $a$ located in a horizontal plane and extending around the rear of the seat. From each end of this arch a strip $a^1$ extends. Each strip $a^1$ firstly depends and then extends forwardly; in extending forwardly it is bent inwardly to the peak $b$, and at its front extremity it is coupled to the side of a U-member constituting the peak $b$. A rivet $c$ may pass through this U-member and secure the front extremities of these two lateral forwardly extending arms, which couple the rear arch $a$ to the peak $b$. The arms of the U constituting the peak $b$ extend rearwardly and carry the seat pin clip $d$, and rearwardly of said clip they diverge outwardly and form the supports $b^1$ for the lower extremities of coiled springs $e$, the upper extremities of which are coupled to the rear arch $a$ near to the ends thereof. A connecting stay $f$ may couple the diverging portions of the U-shaped member.

Centrally in the seat proper is a sheet metal disc $h$ of oval or circular formation. This disc $h$ is perforated at close intervals near to its edge around its entire periphery, and an appropriate number, say seven, coiled springs $i$ extend from the fore part of the said disc $h$ to the transverse part of the U-member $b$ constituting the peak, said transverse part of the U-member $b$ being similarly perforated to accommodate the hook ends of the springs $i$, which at their foremost extremities collectively present a curved contour, and at their rear extremities a substantially flat or level contour. The remaining part of the periphery of the plate is coupled by coiled springs $j$ hooked in similar manner and extending in divergent directions to the arch $a$. There may, for instance, be twenty-three of the rearwardly diverging extending coiled springs $j$ which, with the central plate $h$, constitute the supporting part of the saddle or seat.

It will be observed that the outer springs of the hammock seat are spaced from the supporting frame and constitute flexible bounding edges of the hammock seat which are essentially raised somewhat from the side rims $a^1$ so that the bounding edges of the seat part proper are of a flexible character, thus rendering it much more comfortable.

What I claim as my invention and desire to secure by Letters Patent is:—

1. A saddle or seat comprising a relatively stationary base frame, a hammock supporting frame comprising a bow constituting the rear part of the saddle and forwardly converging rigid arms, said arms being pivotally connected at their front ends to said base frame, one of said frames being formed with a peak, a central member within the hammock supporting frame, a plurality of springs extending rearwardly from the peak to said central member, another plurality of springs diverging rearwardly from the central member to said bow, and supporting springs on the base frame for said hammock supporting frame.

2. A saddle or seat comprising a relatively stationary base frame, a hammock supporting frame, comprising a bow constituting the rear part of the saddle and forwardly converging arms, said arms being pivotally connected at their front end to said base frame, one of said frames being formed with a peak and said base frame having rearwardly extending limbs, a hammock seat within the hammock supporting frame comprising a plurality of springs connected to the bow member diverging therefrom inwardly towards the peak and connected thereto and supporting springs on the limbs of the base frame for said hammock supporting frame.

3. A saddle or seat comprising a relatively stationary base frame, a hammock supporting frame, comprising a bow constituting the rear part of the saddle and forwardly converging arms, said arms being pivotally connected at their front end to said base frame, one of said frames being formed with a peak and said base frame having rearwardly extending limbs, a hammock seat within the hammock supporting frame comprising a plurality of springs connected to the bow member diverging therefrom inwardly towards the peak and connected thereto and supporting springs on the limbs of the base frame for said hammock supporting frame, the outer springs of said plurality of springs being spaced from the supporting frame and constituting flexible bounding edges of the hammock seat.

4. A saddle or seat comprising a base frame having rearwardly extending arms and a peak at the front end connecting said arms, a hammock supporting frame having forwardly converging arms pivotally connected at their front ends to said base frame, supporting springs arranged between said hammock supporting frame and the rear portion of the arms of the base frame, and a hammock seat stretched between said peak and the rear portion of said hammock supporting frame.

In witness whereof I have hereunto set my hand.

ALBERT VICTOR TERRY.